United States Patent
Yu et al.

(10) Patent No.: US 8,768,021 B2
(45) Date of Patent: Jul. 1, 2014

(54) LESION FEATURE CALCULATING DEVICE AND METHOD UTILIZING BORDER SHARPNESS

(75) Inventors: Donghoon Yu, Daejeon (KR); Sooyeul Lee, Daejeon (KR); Jeong Won Lee, Daejeon (KR); Seunghwan Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 130 days.

(21) Appl. No.: 13/470,198

(22) Filed: May 11, 2012

(65) Prior Publication Data
US 2013/0121543 A1    May 16, 2013

(30) Foreign Application Priority Data
Nov. 11, 2011   (KR) .................. 10-2011-0117756

(51) Int. Cl.
*G06K 9/00*     (2006.01)
(52) U.S. Cl.
USPC ........................................... 382/128
(58) Field of Classification Search
None
See application file for complete search history.

(56) References Cited

PUBLICATIONS

Alcón, José Fernández, et al. "Automatic imaging system with decision support for inspection of pigmented skin lesions and melanoma diagnosis." Selected Topics in Signal Processing, IEEE Journal of 3.1 (2009): 14-25.*
Ikedo, Yuji, et al. "Development of a fully automatic scheme for detection of masses in whole breast ultrasound images." Medical physics 34 (2007): 4378.*
Yova, Dido M., et al. "Development of diagnostic algorithms for image analysis of skin lesions." BiOS'97, Part of Photonics West. International Society for Optics and Photonics, 1997.*
D. Yu et al., "CADx using Lesion Boundary on 2-D Breast Ultrasound Images", The Korea Society of Medical & Biological Engineering, May 13, 2011.

* cited by examiner

*Primary Examiner* — Nirav G Patel (57) ABSTRACT

Provided is a device and method for calculating a lesion feature. The device includes a border discriminator configured to discriminate a border of a lesion on an image of an image signal, a border sharpness normalizer configured to normalize a border sharpness based on the border determined by the border discriminator and output the normalized border sharpness as a feature, and a vector generator configured to generate a vector having the feature outputted from the border discriminator as a component. Therefore, by using the lesion feature calculating device and method according to embodiments of the present invention, types of lesions on ultrasonic images are classified based on the borders of the lesions.

12 Claims, 10 Drawing Sheets

LESION FEATURE CALCULATING DEVICE AND METHOD UTILIZING BORDER SHARPNESS

CROSS-REFERENCE TO RELATED APPLICATIONS

This U.S. non-provisional patent application claims priority under 35 U.S.C. §119 of Korean Patent Application No. 10-2011-0117756, filed on Nov. 11, 2011, the entire contents of which are hereby incorporated by reference.

BACKGROUND OF THE INVENTION

The present invention disclosed herein relates to a device and method for calculating lesion features, and more particularly, to a device and method for calculating lesion features on ultrasonic images.

Breast cancer is currently one of the most frequently diagnosed cancers. To determine whether a lesion of a breast is benign and whether a tumor thereof is malignant is important for early detection of the breast cancer. Mammography and breast ultrasonography are typically used for a radiological examination of a breast. According to the breast ultrasonography, a degree of reflection of ultrasonic waves is visualized to provide a cross-sectional image of breast tissue. Compared to the mammography, the breast ultrasonography provides an examination without exposure to radiation and has a high degree of diagnostic accuracy. Thus, the breast ultrasonography is recently widely used.

As an image processing technology is developed, a computer is more frequently used for processing medical images during radiation diagnosis. Therefore, for applying a computer diagnostic technology to the diagnosis of the breast cancer, a device and method for classifying tumors on an ultrasonic image by using a computer are required.

SUMMARY OF THE INVENTION

The present invention provides a device and method for calculating lesion features.

Embodiments of the present invention provide lesion feature calculating devices including a border discriminator configured to discriminate a border of a lesion on an image of an image signal, a border sharpness normalizer configured to normalize a border sharpness based on the border determined by the border discriminator and output the normalized border sharpness as a feature, and a vector generator configured to generate a vector having the feature outputted from the border discriminator as a component.

In some embodiments, the border sharpness normalizer may include a vertical pixel converter configured to collect pixels vertical to the border determined by the border discriminator, a discrete fourier transform (DFT) converter configured to DFT converts the pixels collected by the vertical pixel converter and output an average value, and an integrator configured to integrate the average value outputted from the DFT converter for a frequency band.

In other embodiments, the vertical pixel converter may collect the pixels located within a predetermined distance from the border.

In still other embodiments, the frequency band for the integral of the integrator may be changed.

In even other embodiments, the frequency band for the integral of the integrator may be a low-frequency band less than about $\pi/2$.

In yet other embodiments, the lesion feature calculating device may further include a depth to width ratio (DWR) normalizer configured to normalize a DWR based on the border determined by the border discriminator and output the normalized DWR as a feature value.

In further embodiments, the lesion feature calculating device may further include a compactness normalizer configured to normalize compactness based on the border determined by the border discriminator and output the normalized compactness as a feature value.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
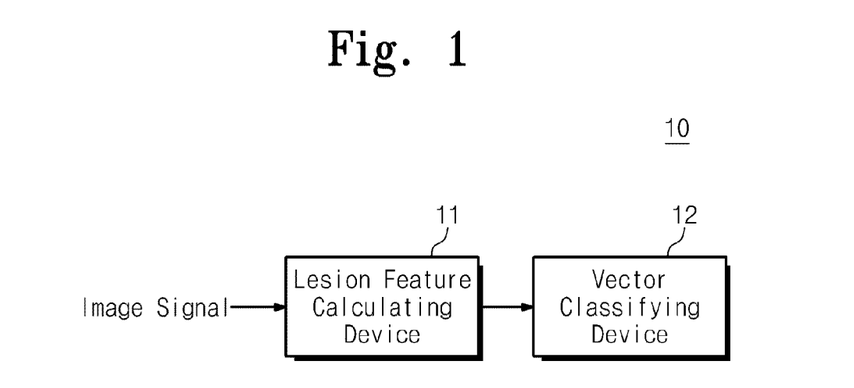
FIG. 1 is a block diagram illustrating a lesion classifying system according to an embodiment of the present invention.

FIG. 1 is a block diagram illustrating a lesion classifying system according to an embodiment of the present invention. Referring to FIG. 1, a lesion classifying system 10 includes a lesion feature calculating device 11 and a vector classifying device 12.

The lesion feature calculating device 11 receives an image signal and calculates a value of a feature. The image signal contains image information on a lesion measured by using breast ultrasonography. The feature is a criterion designated for classifying types of lesions. The types of lesions indicate whether the lesions are benign or malignant tumors. For instance, the feature may be a shape or size of a lesion. The feature has a value of a normalized real number.

The lesion feature calculating device 11 analyzes the image signal to classify the types of lesions on the image of the image signal and calculate the value of the feature. Herein, the feature calculated may be provided in plurality. The lesion feature calculating device 11 vectorizes the calculated features of the image signal and outputs the vectorized features as feature vectors.

The vector classifying device 12 receives the feature vectors from the lesion feature calculating device 11. The vector classifying device 12 classifies the received feature vectors based on a classification algorithm. The classification algorithm used in the vector classifying device 12 may be various. For instance, the vector classifying device 12 may classify the feature vectors by using a neural network. A result of the feature vector classification indicates a result of classification of the lesions on the image.

The feature used for the lesion feature calculating device 11 may be various. Criteria for determining whether the lesions of the breast cancer are benign and malignant are various. Further, a method for normalizing the criteria to feature values may be variously suggested.

Figure 2:
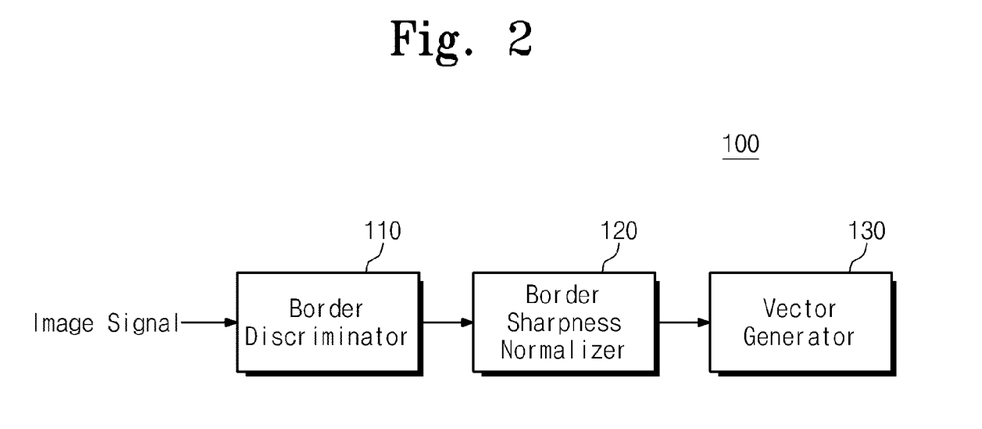
FIG. 2 is a block diagram illustrating a lesion feature calculating device according to an embodiment of the present invention.

FIG. 2 is a block diagram illustrating a lesion feature calculating device 100 according to an embodiment of the present invention. Referring to FIG. 2, the lesion feature calculating device 100 includes a border discriminator 110, a border sharpness normalizer 120, and a vector generator 130.

The border discriminator 110 receives an image signal. Herein, the image signal contains image information on a lesion. For instance, the image signal may contain image information on a lesion measured by using the breast ultrasonography. The border discriminator 110 determines a border of a lesion on the image of the received image signal.

Figure 3:
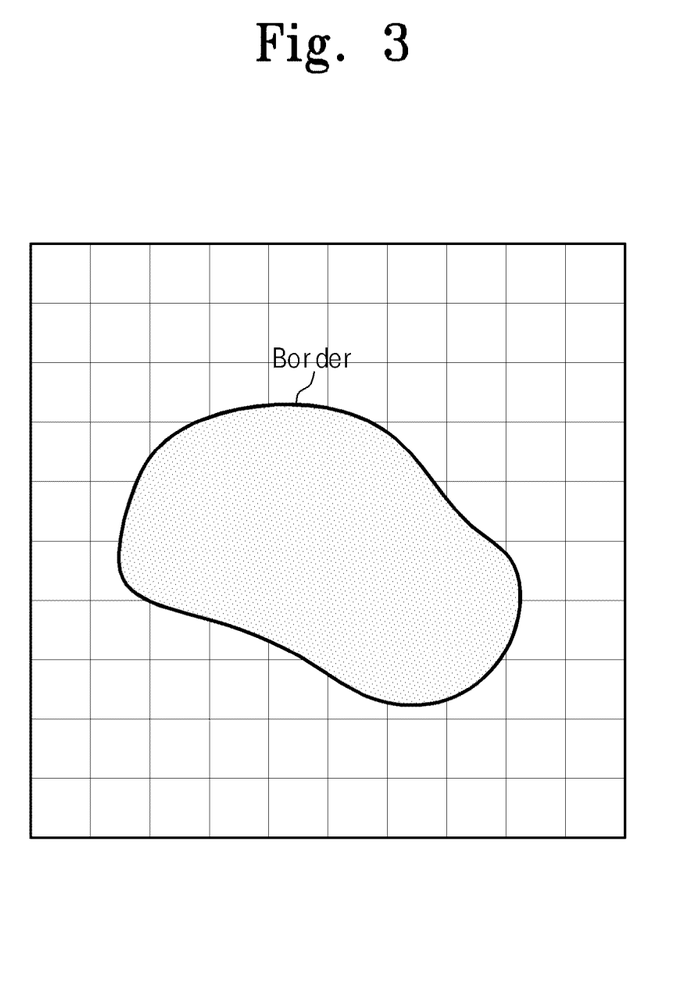
FIG. 3 is a diagram illustrating a border determined by a border discriminator.

FIG. 3 is a diagram illustrating the border determined by the border discriminator 110. The border discriminator 110 analyzes the image signal to distinguish a lesion and determine a border thereof. A lesion discriminating algorithm and a border determining algorithm used for the border discriminator 110 may be various. Further, the border may be manually determined by the border discriminator 110 in response to input of a user.

The border sharpness normalizer 120 normalizes border sharpness as a feature by using the received image signal and the border determined by the border discriminator 110. The border sharpness indicates a degree of clarity of the border of a lesion. That is, the border sharpness indicates how much different inner and outer pixel values are with respect to the border. A benign lesion has a sharp border, whereas a malignant lesion tends to have a blurred border. Therefore, the border sharpness may be used as a feature for classifying the types of lesions.

The border sharpness normalizer 120 normalizes the border sharpness as the feature by using the received image signal and the border determined by the border discriminator 110.

Therefore, the lesion feature calculating device of the present embodiment generates the feature vector using the border sharpness as the feature. In this manner, the types of lesions may be determined based on the border sharpness. Hereinafter, an example of the method for normalizing the border sharpness is described.

Figure 4:
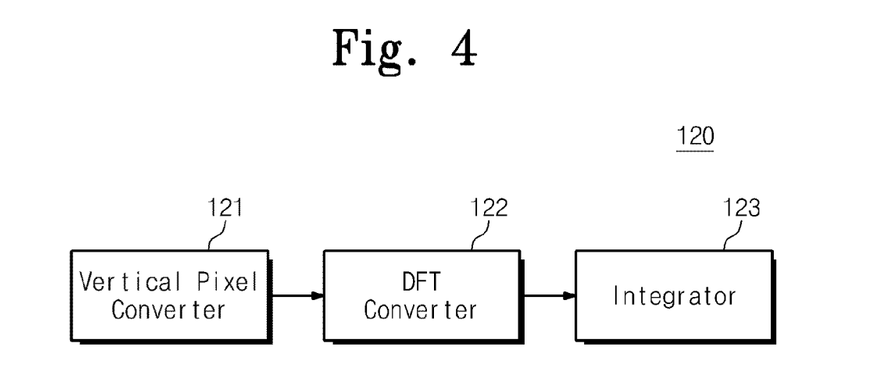
FIG. 4 is a block diagram illustrating an example of a border sharpness normalizer according to embodiments of the present invention.

FIG. 4 is a block diagram illustrating an example of the border sharpness normalizer 120 according to embodiments of the present invention. Referring to FIG. 4, the border sharpness normalizer 120 includes a vertical pixel converter 121, a DFT converter 122, and an integrator 123.

The vertical pixel converter 121 collects pixels in a vertical direction to the border determined by the border discriminator 110. The vertical pixel converter 121 outputs the collected pixels in a row. Hereinafter, an operation of the vertical pixel converter 121 is described with reference to the drawings.

Figure 5:
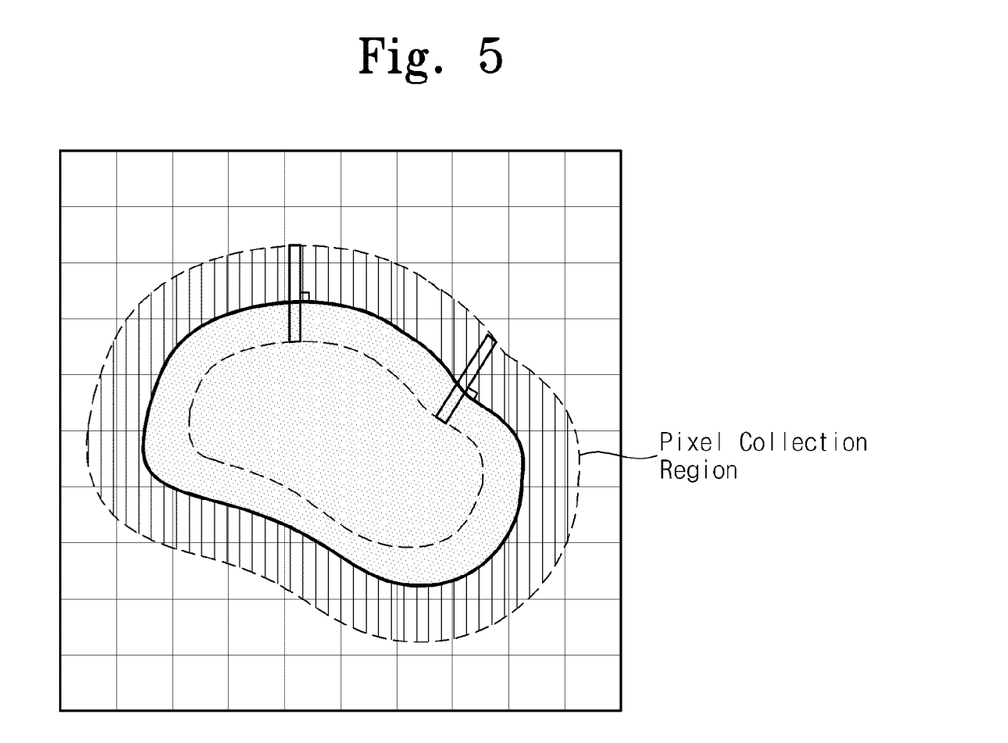
FIG. 5 is a diagram illustrating an operation of a vertical pixel converter.
Figure 6:
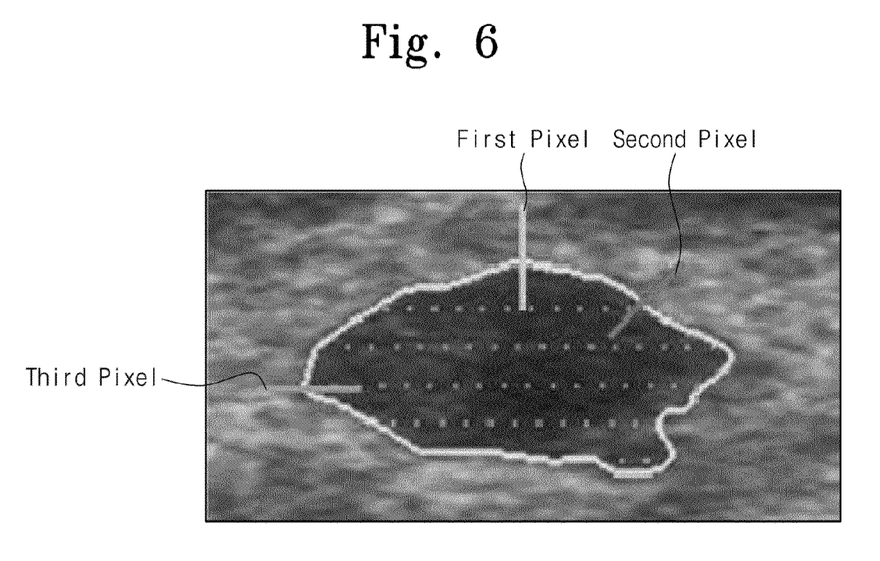
FIG. 6 is a diagram exemplarily illustrating that a border on an ultrasonic image is determined by a border discriminator.
Figure 7:
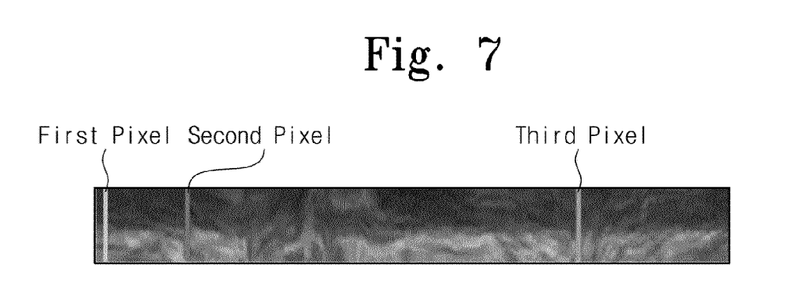
FIG. 7 illustrates a result of vertical pixel collection performed by a vertical pixel converter with respect to the determined border of FIG. 6.

FIG. 5 is a diagram illustrating the operation of the vertical pixel converter 121. FIG. 6 is a diagram exemplarily illustrating that the border on the ultrasonic image is determined by the border discriminator. FIG. 7 illustrates a result of the vertical pixel collection performed by the vertical pixel converter with respect to the determined border of FIG. 6.

Referring to FIGS. 5 to 7, firstly, the border of the lesion on the image is determined by the border discriminator. The line segments illustrated in FIGS. 5 and 6 exemplarily represent the pixels vertical to the border. First to third pixels of FIG. 6 are the same as first to third pixels of FIG. 7. The vertical pixel converter vertically collects pixels along the border of a lesion. Herein, the number of the collected pixels may be the same as that of pixels collected at another portion. Then, the pixels collected along the border are outputted in a row.

Referring to FIG. 4 again, the DFT converter 122 performs a one-dimensional discrete fourier transform (DFT) to the pixels outputted from the vertical pixel converter 121. By averaging results of the transform with respect to a frequency band, frequency feature of the border may be understood. Hereinafter, an operation of the DFT converter is described with reference to the drawings.

Figure 8:
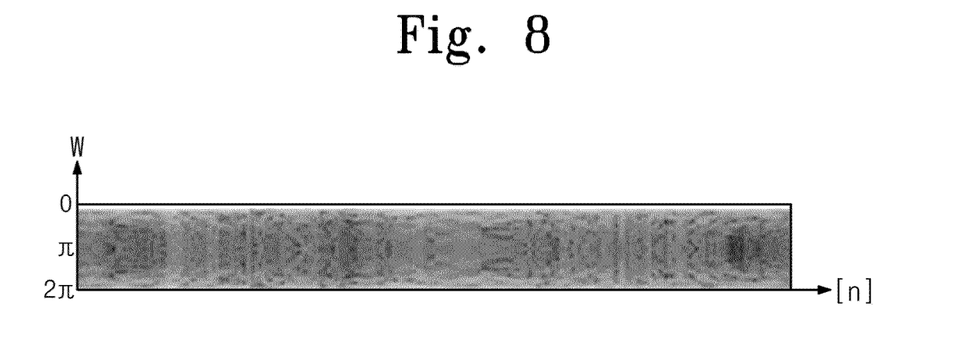
FIG. 8 is a diagram illustrating a result of DFT of the collected pixels of FIG. 7.

FIG. 8 is a diagram illustrating a result of the DFT of the collected pixels of FIG. 7.

Figure 9:
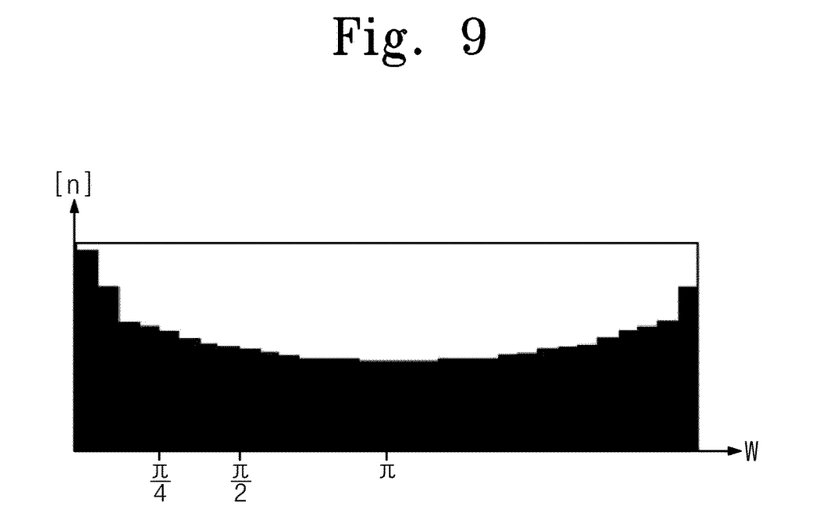
FIG. 9 is a diagram illustrating a result of averaging the transformed data of FIG. 8.

FIG. 9 is a diagram illustrating a result of averaging the transformed data of FIG. 8 with respect to a frequency band.

Referring to FIGS. 8 and 9, the collected pixels are expressed in a frequency domain after the DFT. When the results of the transform are averaged for each frequency, frequency components of the collected pixels may be analyzed.

Referring to FIG. 9, the frequency components of the collected pixels for each frequency band may be checked. Herein, the border sharpness of a lesion may be determined by comparing the frequency components of the exemplary image with those of a predetermined reference image. The integrator is used for calculating objective indices of the border sharpness based on the results obtained from the DFT converter.

Referring to FIG. 4 again, the integrator 123 integrates the averaged DFT data received from the DFT converter 122 with respect to a frequency. A result of the integral of the integrator 123 is outputted as a feature value of the border sharpness. A frequency band for the integral of the integrator 123 may be specified. The integral may be mostly performed in a low-frequency band because a high-frequency band is greatly occupied by a noise. Also, for correctness, DC frequency is excluded from the frequency band for the integral of the integrator 123. For instance, the frequency band for the integral of the integrator 123 may be less than about $\pi/2$. Preferably, the frequency band for the integral of the integrator 123 may be about π/16 to about π/4. However, this is just an example, and the present invention is not limited thereto.

The vector generator 130 generates a feature vector by using the feature value of the border sharpness received from the integrator 123. The feature vector has values of received features as components. The vector generator 130 outputs the generated feature vector.

Therefore, the lesion feature calculating device according to the present embodiment objectively normalizes the border sharpness by using frequency feature of the image. In this manner, the types of lesions may be determined based on the border sharpness. However, other various features besides the border sharpness may be used for determining the types of lesions. Therefore, in the present invention, a lesion feature calculating device, which generates a feature vector having various features as components thereof by normalizing various features, is proposed.

Figure 10:
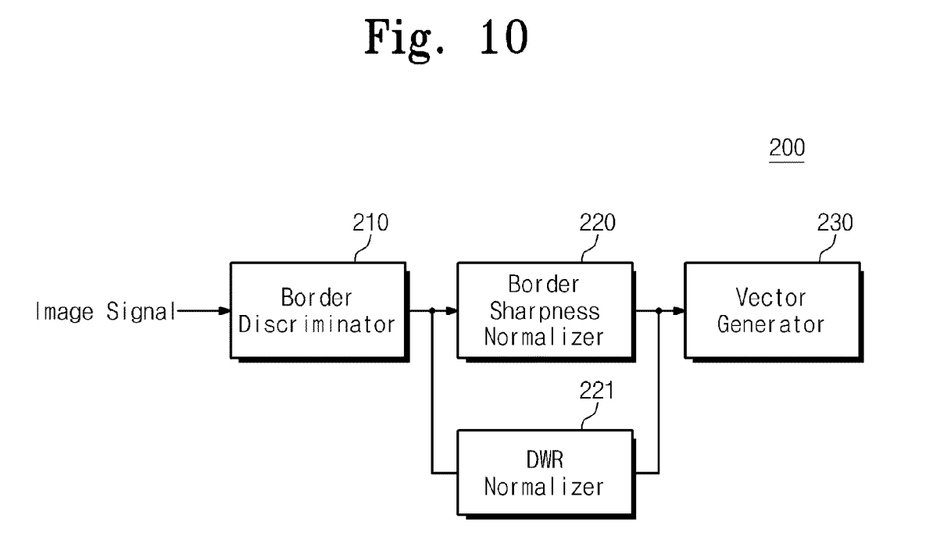
FIG. 10 is a block diagram illustrating a lesion feature calculating device according to another embodiment of the present invention.

FIG. 10 is a block diagram illustrating a lesion feature calculating device according to another embodiment of the present invention. Referring to FIG. 10, a lesion feature calculating device 200 includes a border discriminator 210, a border sharpness normalizer 220, a DWR normalizer 221, and a vector generator 230. The lesion feature calculating device 200 of FIG. 10 has the same operation and structure as the lesion feature calculating device 100 of FIG. 4 except for the addition of the DWR normalizer 221.

The DWR normalizer 221 normalizes a DWR feature of the image of the image signal and outputs the normalized feature. DWR (depth to width ratio) indicates a ratio of a maximal horizontal length of a lesion to a maximal vertical length thereof. A malignant tumor is softer than a benign tumor, and thus becomes flat and has a longer horizontal length when it is compressed. Therefore, a tumor having a great DWR value is highly possibly malignant. The DWR normalizer 221 measures the maximal horizontal and vertical lengths based on the border determined by the border discriminator 210 to calculate and output a DWR feature value. Herein, the DWR is calculated as (maximal horizontal length of lesion)/(maximal vertical length of lesion).

Figure 11:
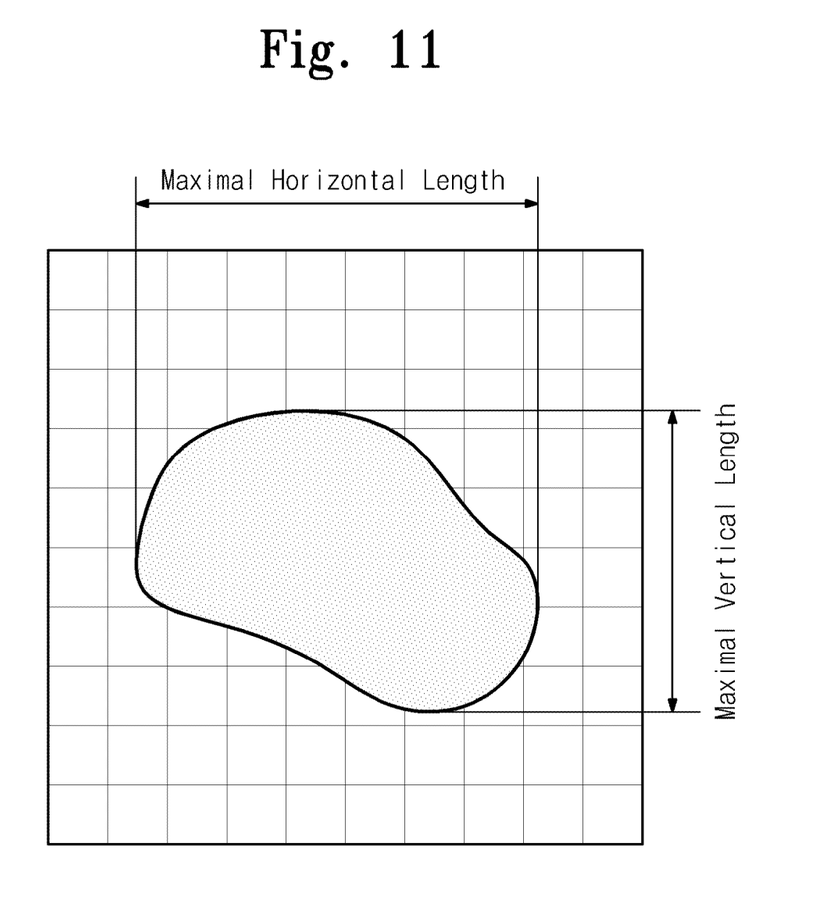
FIG. 11 is a diagram illustrating maximal horizontal and vertical lengths of a lesion which are measured by a DWR normalizer of FIG. 10.

FIG. 11 is a diagram illustrating the maximal horizontal and vertical lengths of a lesion which are measured by the DWR normalizer 221 of FIG. 10.

The vector generator 230 generates a feature vector by using the border sharpness feature value received from the border sharpness normalizer 220 and the DWR feature value received from the DWR normalizer 221.

Therefore, the lesion feature calculating device according to the present embodiment normalizes the border sharpness and the DWR. In this manner, the types of lesions may be determined based on the border sharpness and the DWR. However, other various features besides the border sharpness and DWR may be used for determining the types of lesions. Therefore, in the present invention, a lesion feature calculating device, which generates a feature vector having various features as components thereof by normalizing various features, is proposed.

Figure 12:
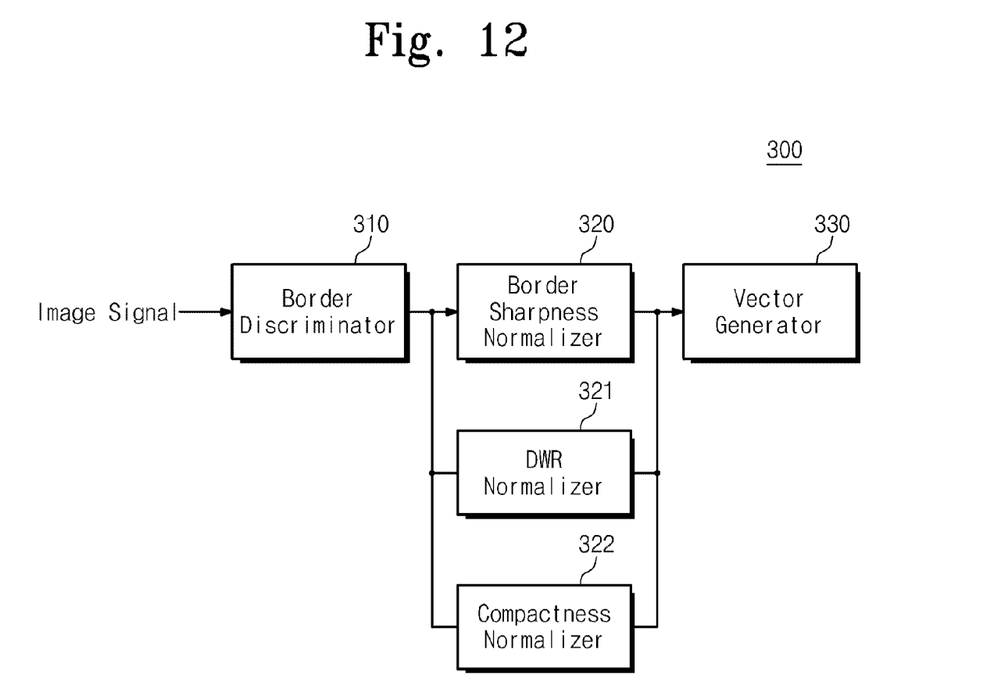
FIG. 12 is a block diagram illustrating a lesion feature calculating device according to further another embodiment of the present invention.

FIG. 12 is a block diagram illustrating a lesion feature calculating device according to another embodiment of the present invention. Referring to FIG. 12, a lesion feature calculating device 300 includes a border discriminator 310, a border sharpness normalizer 320, a DWR normalizer 321, a compactness normalizer 322, and a vector generator 330. The lesion feature calculating device 300 of FIG. 12 has the same operation and structure as the lesion feature calculating device 200 of FIG. 10 except for the addition of the compactness normalizer 322.

The compactness normalizer 322 normalizes a compactness feature of the image of the image signal and outputs the normalized feature. The compactness indicates how much a lesion is shaped like a circle. In general, the compactness is calculated as (area)/(perimeter length). However, in this case, the calculated compactness increases as the area of a lesion increases. Therefore, to normalize the compactness regardless of the size, a value of improved compactness, i.e., 2(square root of Pi)(square root of area)/(perimeter length), is used as a compactness feature value. As the shape of a lesion is closer to a circle, the compactness is closer to 1.

The compactness normalizer 322 calculates the area and perimeter length based on the border determined by the border discriminator 310. The compactness normalizer 322 normalizes the compactness feature based on a result of the calculation and outputs the normalized feature.

The vector generator 330 generates a feature vector by using the border sharpness feature value received from the border sharpness normalizer 320, the DWR feature value received from the DWR normalizer 321, and the compactness feature value received from the compactness normalizer 322.

Therefore, the lesion feature calculating device according to the present embodiment normalizes the border sharpness, the DWR, and the compactness. In this manner, the types of lesions may be determined based on the border sharpness, the DWR, and the compactness.

Figure 13:
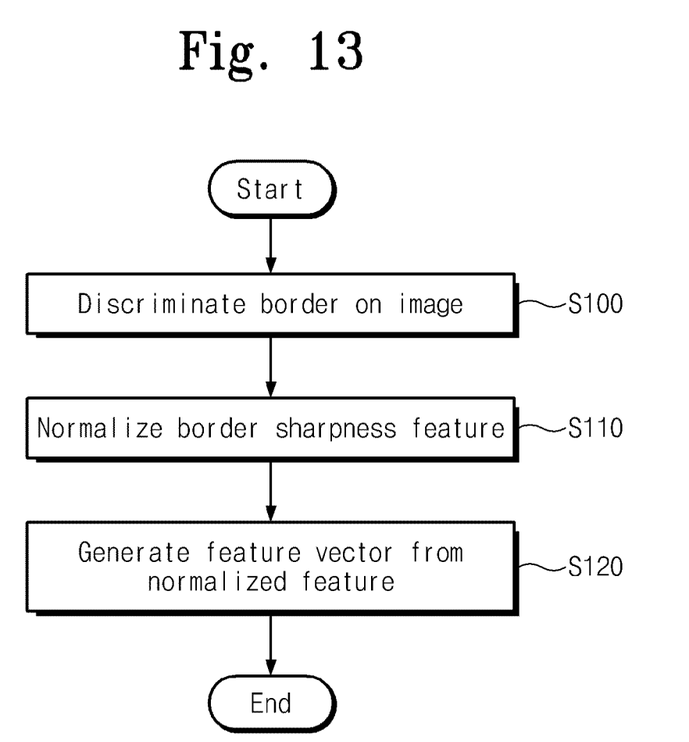
FIG. 13 is a flowchart illustrating an exemplary method for calculating a lesion feature according to embodiments of the present invention.

FIG. 13 is a flowchart illustrating an exemplary method for calculating a lesion feature according to embodiments of the present invention. Referring to FIG. 13, a border of an image of an inputted image signal is determined in operation S100. A border sharpness feature is normalized based on the determined border in operation S110. Further, a feature vector having the normalized feature as a component thereof is generated in operation S120.

Therefore, according to the lesion feature calculating method of the present embodiment, the feature vector for classifying lesions is generated by using the border sharpness as a feature.

Figure 14:
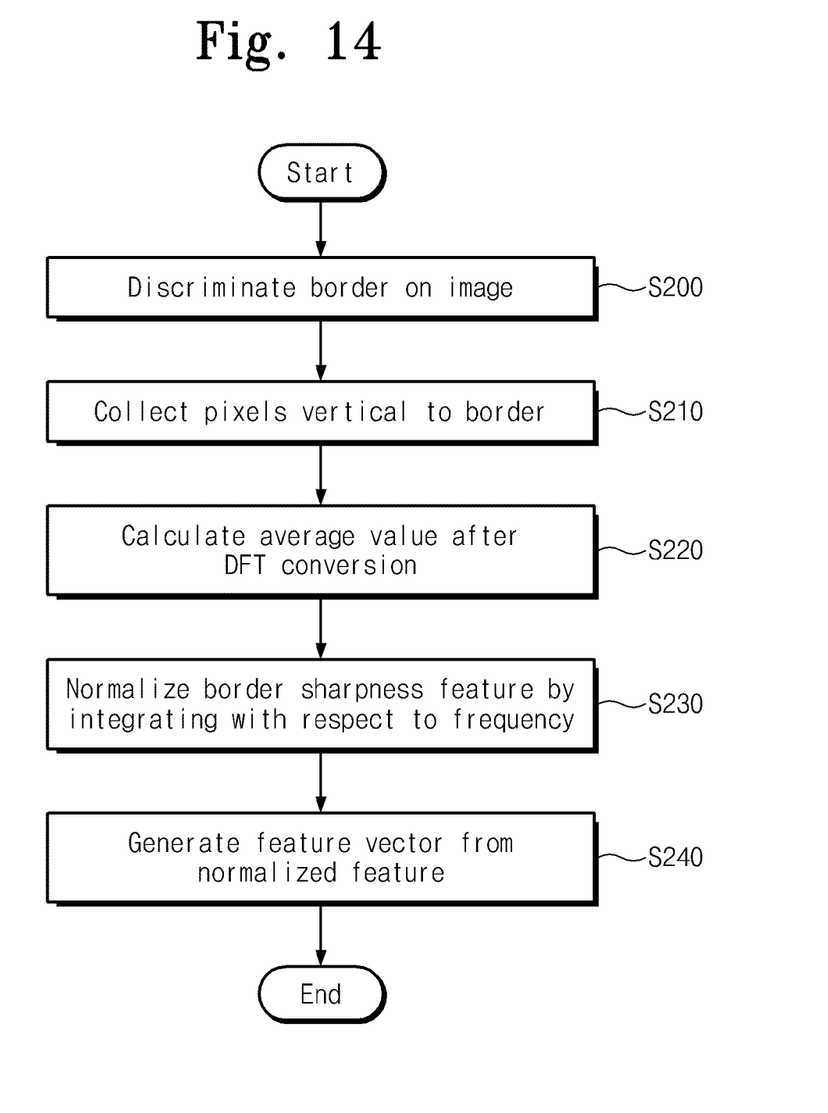
FIG. 14 is a flowchart illustrating another exemplary method for calculating a lesion feature according to embodiments of the present invention.

FIG. 14 is a flowchart illustrating another exemplary method for calculating a lesion feature according to embodiments of the present invention. Referring to FIG. 14, a border of an image of an inputted image signal is determined in operation S200. Pixels located within a certain distance from the determined border are collected in a vertical direction to the border in operation S210. The collected pixels are aligned in a row and are DFT converted. Then, an average value of the converted data is calculated with respect to a frequency domain in operation S220. Data which represent each frequency band feature obtained from the average value are integrated for a certain frequency band in operation S230. Herein, the frequency band for the integral may be designated. A feature vector is generated using the calculated value of the integral as a border sharpness feature value in operation S240.

Therefore, according to the lesion feature calculating method of the present embodiment, the border sharpness is objectively normalized by using the frequency feature of the image. In this manner, the types of lesions may be determined based on the border sharpness.

By using the lesion feature calculating device and method according to embodiments of the present invention, the types of the lesions on the ultrasonic image can be easily classified by using the borders of the lesions.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A lesion feature calculating device comprising:
    a border discriminator configured to discriminate a border of a lesion on an image of an image signal;
    a border sharpness normalizer configured to normalize a border sharpness based on the border determined by the border discriminator and output the normalized border sharpness as a feature value; and
    a vector generator configured to generate a vector having the feature value as a component,
    wherein the border sharpness normalizer comprises:
        a vertical pixel converter configured to collect pixels vertical to the border;
        a discrete fourier transform (DFT) converter configured to perform a discrete fourier transform on the pixels collected by the vertical pixel converter and output an average value; and
        an integrator configured to integrate the average value outputted from the DFT converter for a frequency band to output the feature value.

2. The lesion feature calculating device of claim 1, wherein the vertical pixel converter collects pixels located within a predetermined distance from the border.

3. The lesion feature calculating device of claim 1, wherein the frequency band for the integral of the integrator is changed.

4. The lesion feature calculating device of claim 1, wherein the frequency band for the integral of the integrator is a low-frequency band in a range of zero to $\pi/2$.

5. The lesion feature calculating device of claim 1, further comprising a depth to width ratio (DWR) normalizer configured to normalize a DWR based on the border and output the normalized DWR as a feature value.

6. The lesion feature calculating device of claim 1, further comprising a compactness normalizer configured to normalize compactness based on the border and output the normalized compactness as a feature value.

7. A lesion feature calculating method comprising:
    discriminating a border of a lesion on an image of an image signal inputted;
    calculating a feature value by normalizing a border sharpness based on the border; and
    generating a feature vector having the calculated feature value as a component,
    wherein the calculating of the feature value comprises:
        collecting pixels vertical to the border;
        calculating an average value by DFT converting the collected pixels; and
        calculating the feature value by integrating the average value for a frequency band.

8. The lesion feature calculating method of claim 7, further comprising calculating a feature value by normalizing a depth to width ratio based on the border.

9. The lesion feature calculating method of claim 7, further comprising calculating a feature value by normalizing compactness based on the border.

10. The lesion feature calculating method of claim 7, wherein collecting the pixels comprises collecting pixels located within a predetermined distance from the border.

11. The lesion feature calculating method of claim 7, wherein the frequency band for the integral of the average value is changed.

12. The lesion feature calculating method of claim 7, wherein the frequency band for the integral of the average value is a low-frequency band in a range of zero to $\pi/2$.

* * * * *